Oct. 15, 1946.    H. M. HILGER    2,409,487
TEETER-GO-ROUND
Filed April 20, 1945
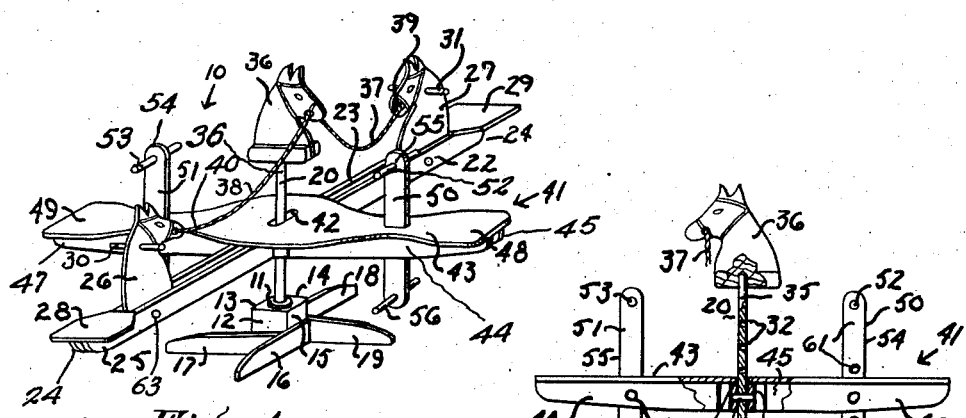
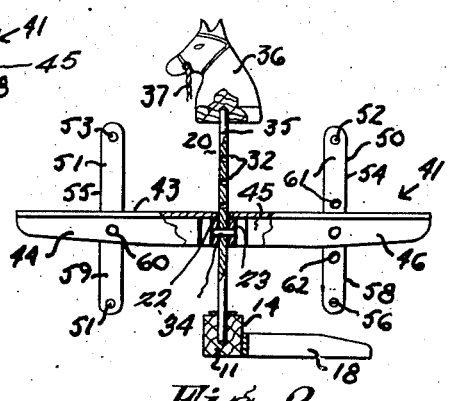
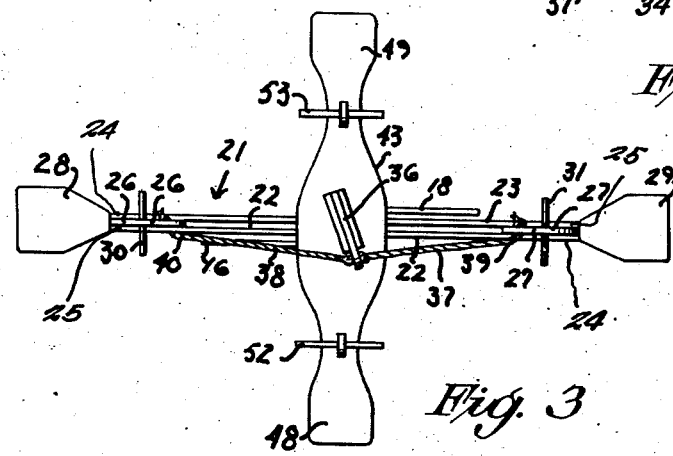
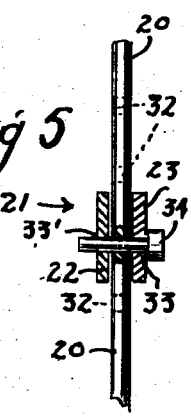
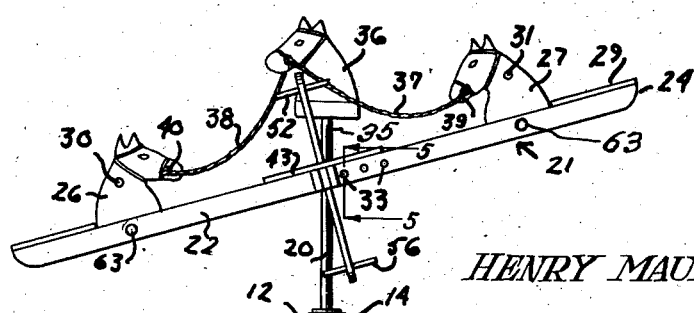
Inventor
*HENRY MAURICE HILGER*
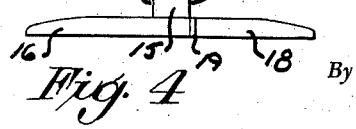
By
*Attorneys*

Patented Oct. 15, 1946

2,409,487

UNITED STATES PATENT OFFICE 2,409,487

TEETER-GO-ROUND

Henry Maurice Hilger, Fort Wayne, Ind.

Application April 20, 1945, Serial No. 589,342

4 Claims. (Cl. 272—30)

This invention relates to amusement devices and has for an object to provide a combined carousal and teeter adjustable for children of various sizes.

Another object of the invention is to provide a merry-go-round and see-saw combination so constructed that it may be used by two, three, or four children from infant to large size, at one and the same time, with perfect safety to all.

A further object of the invention is to provide a combined teeter for two children and an extensible attachment with accommodations for one or two additional passengers.

Other features and advantages will become more readily apparent from the following description and the accompanying illustrative drawing in which:

Figure 1 is a perspective view of my amusement device,

Figure 2 is a detail elevation, partly in section, of certain of the members of the device, Figure 3 is a top plan view of Figure 1, Figure 4 is a side elevational view of the device, and Figure 5 is an enlarged detail section on line 5—5 of Figure 4, certain parts being removed.

In the drawing and specification the same reference characters indicate the same parts and 10 represents my complete device, which comprises a square base block 11, to the four sides 12, 13, 14 and 15 of which are fixed four horizontal relatively long legs 16, 17, 18 and 19. Pivotally seated in the block 11, is vertical round shaft 20, which forms a support for the teeter 21. This teeter is formed of a pair of boards 22 and 23, spaced apart adjacent their ends 24 and 25, by spacers in the shape of horse heads 26 and 27, outwardly of which are seats 28 and 29. Each of said heads is provided with handle bars 30 and 31, respectively.

The rotatable round shaft 20, is of a diameter equal to the thickness of the spacers 26 and 27, and is provided with a series of spaced bores 32, with any one of which, any one of the aligning bores 33 and 33', in members 22 and 23, may be aligned to receive the pivot pin 34, whereby the teeter 21, is mounted upon said round shaft 20, whereby it may see-saw up and down on the round shaft. The purpose of the bores 33 and 33', is for lengthwise adjustment of the teeter in order to balance with children of different weights.

Pivotally and removably seated upon the upper end 35, of the upright 20, is a horse head 36, to which are secured lines 37 and 38, the other ends 39 and 40, of which are attached to the heads 26 and 27.

Seated transversely upon the teeter 21, is a teeter-totter 41, the round shaft 20, projecting through an elongated slot 42, in the board 43, mounted upon the edgewise disposed boards 44, 45, 46 and 47, which elements 43 to 47, form the teeter-totter 41. The ends 48 and 49, of the board 43 are shaped to form seats, and inwardly of these seats are passed vertical supports 50 and 51, for the handles 52 and 53, on the upper ends 54 and 55, thereof and footrests 56 and 57, on their lower ends 58 and 59. These supports 50 and 51, form spacers between the boards 44 and 45, and 46 and 47, of the teeter-totter and which supports may either be fixed or pivoted as indicated at 60. This teeter-totter is for small tots and is of lesser length than the teeter 21, in order that when larger children on the teeter rotate the device with their feet, the centrifugal force will be less at the seats 48 and 49, whereby tots seated thereon will not be thrown off. The handles 52, and footrests 56, may be adjusted through added bores 61 and 62, in member 50, to accommodate infants of different sizes, if desired. The heads 26 and 27 may be pivoted as indicated at 63. In the latter case the movement of said heads will cause automatic movement of the head 36.

It is my intention that the teeter 21, may be sold separately from the teeter-totter 41, if desired by a purchaser and that the latter member may be purchased later if required and placed upon the teeter by simply removing head 36. The slot 42, is parallel with the teeter in order to permit rocking motion relative to the members of the device.

It is thought that persons skilled in the art to which the invention relates will be able to obtain a clear understanding of the invention after considering the description in connection with the drawing. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. In a device as described, a teeter, a teeter-totter removably seated thereon, a rotatable shaft upon which the teeter is vertically and horizontally adjustably mounted, a slot in the teeter-totter through which the shaft is adapted to project, a removable head on the shaft, and means for automatic movement of the head.

2. In a device as described, a rectangular base, legs projecting from each side thereof, a shaft rotatably supported in a bore of the base, a teeter having a slot extending from end to end vertically adjustable on the shaft and horizontally adjustable thereon, a top piece pivoted on the upper end of the shaft, means for oscillating the same, said piece being removable, a teeter-totter fulcrumed to teeter and pivoted supports adjacent each end of the teeter-totter having foot and hand holds on the opposing ends thereof.

3. In a device as described, a rectangular base, legs projecting from each side thereof, a shaft rotatably supported in a bore of the base, a teeter having a slot extending from end to end horse heads pivoted in the slot, a top piece pivoted on the upper end of the shaft, means for oscillating the same, said piece being removable, and a detachable teeter-totter fulcrumed to teeter.

4. In a device as described, a rectangular base, legs projecting from each side thereof, a shaft rotatably supported in a bore of the base, a teeter having a slot extending from end to end vertically adjustable on the shaft and horizontally adjustable thereon, a top piece pivoted on the upper end of the shaft, means for oscillating the same, and said piece being removable.

HENRY MAURICE HILGER.